United States Patent [19]

Biancale

[11] Patent Number: 4,854,630
[45] Date of Patent: Aug. 8, 1989

[54] BOW CONNECTOR DEVICE FOR TARPAULIN COVER

[76] Inventor: Vito Biancale, R.R #2, Dundas, Ontario, Canada

[21] Appl. No.: 152,627

[22] Filed: Feb. 5, 1988

[30] Foreign Application Priority Data

Jul. 23, 1987 [CA] Canada .................................. 542788

[51] Int. Cl.$^4$ ............................................. B62D 25/06
[52] U.S. Cl. .................................................... 296/100
[58] Field of Search ................................. 296/100, 105

[56] References Cited

U.S. PATENT DOCUMENTS

| | | | |
|---|---|---|---|
| 1,263,759 | 4/1918 | Hanaway | 296/105 |
| 4,248,475 | 2/1981 | Johnson | 296/100 |
| 4,285,539 | 8/1981 | Cole | 296/105 |
| 4,289,346 | 9/1981 | Bourgeois | 296/105 |

Primary Examiner—Robert R. Song
Attorney, Agent, or Firm—Kane, Dalsimer, Sullivan, Kurucz, Levy, Eisele and Richard

[57] ABSTRACT

A connector device for the ends of bows used in collapsible tarpaulin cover systems for truck bodies, truck trailers and the like. The connector comprises a plug portion to releasably fit inside the end of a bow, securing means to releasably lock that plug portion in position therein, and a body portion secured to the plug portion to be seated outside the end of the bow and provided with a linear aperture for slidably receiving the semi-rigid linear support means on which the bow is mounted. The connector device permits easy replacement of damaged bows without the need to remove the semi-rigid linear support means from the connector.

4 Claims, 1 Drawing Sheet

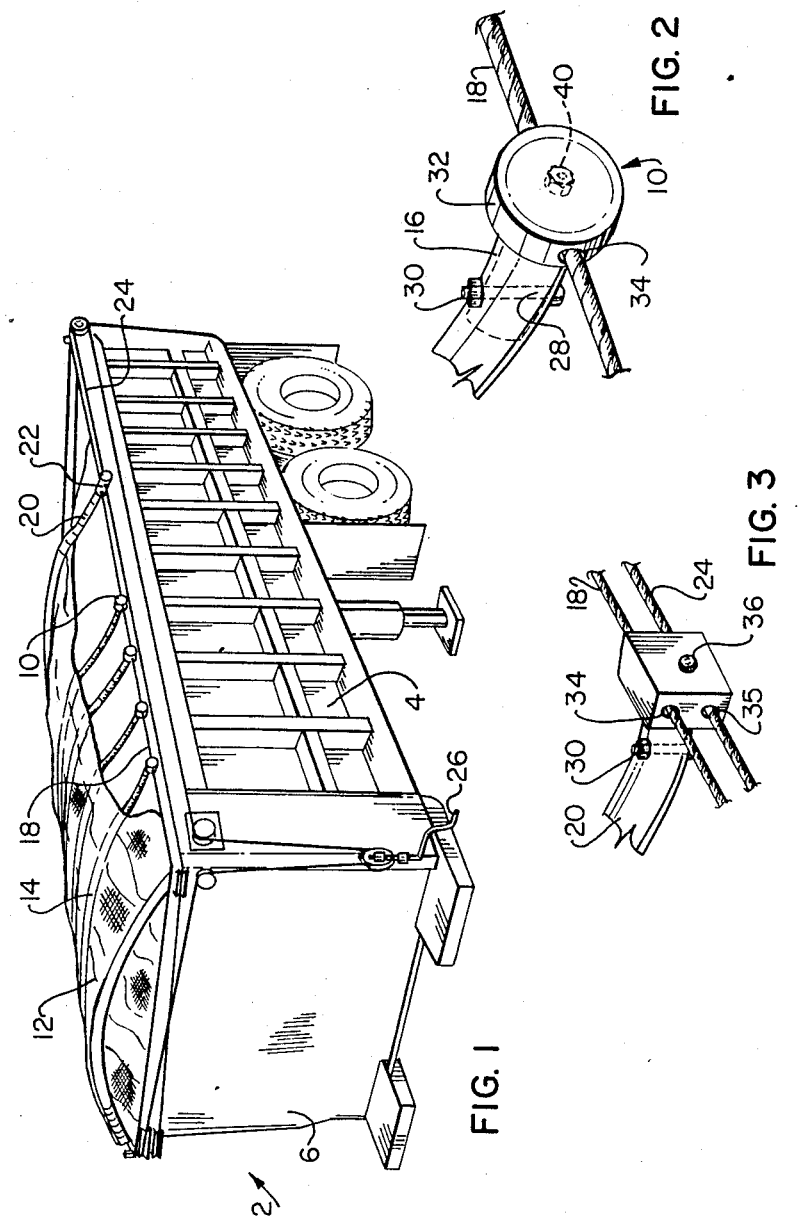

BOW CONNECTOR DEVICE FOR TARPAULIN COVER

BACKGROUND OF THE INVENTION

The present invention relates to a connector device for mounting the ends of the bows used in collapsible tarpaulin cover systems for truck bodies, truck trailers and the like.

Tarpaulin cover systems, of the type in question, are designed for open-top truck bodies, open-top or flat-bed trailers and the like. Such systems, as described for example in Biancale Canadian Pat. No. 1,094,129 issued Jan. 20, 1981 and Cramaro Canadian Pat. No. 995,714 issued Aug. 24, 1976, comprise a tarpaulin, one end of which is secured to the front of the truck body and designed to be drawn from collapsed position at the front of the truck body, over the truck body to cover a load carried thereon. A plurality of transversely extending tubular intermediate bows are provided, the ends of which are slidably mounted on a pair of spaced, horizontally extending semi-rigid linear support means, usually taking the form of a cable or a plurality of cables, which cables extend along the upper ends of the sides of the truck body or trailer. These intermediate bows are secured in spaced fashion to the tarpaulin. A transversely extending tubular lead bow is secured to the free end of the tarpaulin with its ends fixedly secured to a movable cable means. Movement of the cable means in one direction draws the lead bow, intermediate bows and tarpaulin longitudinally across the top of the truck body to the back thereof, to cover it; movement of the cable means in the other direction causes the lead bow, and intermediate bows and tarpaulin to move longitudinally to the front of the truck body, exposing the truck body, for example for loading or unloading of its cargo. The semi-rigid linear support means and the movable cable means may be one and the same in the form of a cable.

Conventionally the intermediate and lead bows have sleeves welded to their ends, through which sleeves the semi-rigid linear support means or cable means slidably pass. Once the linear support means or cable means are in position in such sleeves, it is not possible to replace a damaged bow unless the linear support means or cable means are removed from the sleeves at the ends of the damaged bow and then rethreaded through the sleeves of the replacement bow.

Beckman U.S. Pat. No. 3,321,305 issued Jan. 25, 1966 describes and illustrates a collapsible cover assembly for vehicles in which a plurality of transverse tubular bow members have their ends carried in sleeves which slide upon a rigid track in the form of a tubular rail. The ends of the tubular bows are telescoped over upstanding tubular posts which are welded directly to the track mounted sleeves and may be raised or lowered, as required, to ensure tautness of the tarpaulin. This system, while permitting removal and replacement of bows for covers for small trucks such as pick-up trucks, is intended for operation in conjunction with ridig rails and consequently is unsuitable for tarpaulin cover systems for larger trucks as is the intention of the present invention.

It is an object of the present invention to provide a means to facilitate removal and replacement of bows of collapsible tarpaulin cover systems of the type in question.

SUMMARY OF THE INVENTION

In accordance with the present invention there is provided a connector device for a collapsible tarpaulin cover system for open-top truck bodies, trailers and the like, the tarpaulin cover system being of the type comprising a tarpaulin with a plurality of transversely extending tubular intermediate bows, the ends of which are slidably mounted on a pair of spaced, horizontally extending non-moving semi-rigid linear support means positioned on either side of the truck body or trailer. The bows are secured in spaced fashion to the tarpaulin. A transversely extending tubular lead bow is secured to one end of the tarpaulin with its ends fixedly secured to a movable cable means. Movement of the cable means in one direction draws the lead bow, intermediate bows and tarpaulin longitudinally across the truck body or trailer to its back end to cover it. Movement of the cable means in the other direction draws the lead bow, intermediate bows and tarpaulin in the longitudinal direction to the front end to open the truck body or trailer top. The connector device is provided to mount the ends of the intermediate bows on the semi-rigid linear support means. Each such device comprises a plug portion to releasably snugly fit inside one end of the bow. Securing means releasably lock that plug portion in position in that end of the bow. A body portion is secured to the plug portion to the seated outside the end of the bow. The body portion is provided with a linear aperture for slidably receiving the semi-rigid linear support means.

Where the connector device is to be used on the lead bow, the body portion is further provided with another linear aperture for receiving the cable means and securing means associated with the body portion to releasably secure the connector to the cable means and thereby prevent relative sliding mvoement of the body portion with respect to the cable means.

The connector device in accordance with the present invention may also be used on tarpaulin cover systems of the type where the intermediate bows are slidably mounted on the movable cable means.

The connector device according to the present invention permits ready replacement of damaged bows without having to remove the semi-rigid linear support means or movable cable means from the connector body through which it passes. The securing means for the plug portion is simply released at each end of the bow, to permit removal of the bow from the two connector devices and the mounting on the connector devices of another bow.

BRIEF DESCRIPTION OF THE DRAWINGS

These and other objects and advantages of the invention will become apparent upon reading the following detailed description and upon referring to the drawings in which:

FIG. 1 is a perspective view of an open-top truck body with a collapsible tarpaulin cover system having associated therwith bow connectors in accordance with the present invention;

FIG. 2 is an enlarged detail perspective view, in partial section, of the end of one of the bows of the tarpaulin system of FIG. 1, illustrating a connector device in accordance with the present invention; and FIG. 3 is an enlarged detail perspective view, in partial section, of an alternative embodiment of connector in accordance with the present invention, adapted for a lead bow.

While the invention will be described in conjunction with example embodiments, it will be understood that it is not intended to limit the invention to such embodiments. On the contrary, it is intended to cover all alternatives, modifications and equivalents as may be included within the spirit and scope of the invention as defined by the appended claims.

DETAILED DESCRIPTION OF THE INVENTION

In the drawings, similar features have been given similar reference numerals.

Turning to the drawings, there is illustrated in FIG. 1 an open-top truck body 2 having sides 4 and front end 6, on which is mounted a collapsible tarpaulin cover system 8 to which the connector device 10 of the present invention is particularly adapted. Tarpaulin cover system 8 comprises a tarpaulin 12 supported by and secured at spaced intervals to the plurality of transversely extending intermediate tubular bows 14. The ends 16 of each of these intermediate bows are slidably mounted on a pair of spaced linear support means in the form of non-moving cables 18 which horizontally extend along the top edge of each of sides 4 from front wall 6 to the rear. A transversely extending lead tubular bow 20 is secured to the rear portion of the tarpaulin, with its ends 22 fixedly secured to a movable cable 24, which cable is movable by operation of winch 26 so that corresponding portions of the cable along upper edges of either side 4 move correspondingly forwardly to draw the tarpaulin, lead bow and intermediate bows longitudinally to expose the platform of the truck body and movement of the cable in the other direction causes the lead bow, intermediate bows and tarpaulin to be drawn longitudinally across the truck body platform to cover it. While, in the illustrated embodiment, movable cable 24 and semi-rigid cable 18 are two separate cable systems, a single cable system may be provided by slidably securing the ends 16 of intermediate bow 14 on movable cable 24. Movable cable 24 may be a single continuous cable system as for example in Biancale Canadian Pat. No. 1,094,129, or alternatively may be a pair of cables on either side 4 of the truck body adapted to be movable correspondingly by operation of winch 26.

To the end 16 of each of intermediate bow 14 is releasably secured a connector 10 in accordance with the present invention (FIG. 2). Each such connector comprises a plug portion 28 which flushly but releasably fits inside end 16 of tubular bow 14 and is secured therein by means of i.e. nut and bolt means 30. A body portion 32 is secured to the plug portion 28 so that it is seated outside the end of the bow 14 when in position. Body portion 10 is provided with a linear aperture 34 for slidably receiving semi-rigid cable 18. Thus, when a bow 14 must be replaced, instead of having to remove cable 18 from its fixed position on either side 4 and unthreading the sleeved ends of bows 14 as was the case conventionally, using the connector 10 according to the present invention, bow 14 may be replaced merely by unfastening nut and bolt means 30 on each end 16 on bow 14, with cable 18 on each side still in place through apertures 34 in body portions 32 of the corresponding connectors, and placing a new bow 14 with its ends over plug 28 and secured by nut and bolt means 30 thereto.

A similar arrangement may be provided to connect the ends 22 of lead bow 20 to movable cable 24. In this case however as illustrated in FIG. 3, an additional aperture 35 is provided in body portion 32 to receive movable cable 24, and appropriate securing means 36 is provided to ensure that, when in operative position, it does not permit relative sliding movement of connector 10 with respect to cable 24 during operation of the tarpaulin system.

Of course, as prevoiusly indicated, the connector in accordance with the present invention works equally well when the semi-rigid linear support cable 18 and the movable cable 24 are one and the same. In this case, when applied to a lead bow, a further securing means 40 (phantom, FIG. 1) is required to fix the connector to the cable 24, and additional aperture 35 is not required. As well, with a semi-rigid non-moving cable and a second moving cable for the lead bow, the bow-cable connectors of the present invention could be supplied as removable or non-removable, such as welded to the bow body.

Connector 10 may be made of any appropriate material such as metal or, preferably, a durable plastic.

Thus it is apparent that there has been provided in accordance with the invention a connector device that fully satisfies the objects, aims and advantages set forth above. While the invention has been described in conjunction with a specific embodiment thereof, it is evident that many alternatives, modifications and variations will be apparent to those skilled in the art in light of the foregoing description. Accordingly, it is intended to embrace all such alternatives, modifications and variations as fall within the spirit and broad scope of the invention.

What I claim as my invention:

1. In a collapsible tarpaulin cover system for open-top truck bodies, trailers and the like, the system comprising a tarpaulin with a plurality of transversely extending tubular intermediate bows, the ends of which are slidably mounted on a pair of spaced, horizontally extending non-moving linear semi-rigid support means positioned on either side of the truck body or trailer, the bows secured in spaced fashion to the tarpaulin, and a transversely extending tubular lead bow secured to one end of the tarpaulin with its ends fixedly secured to a movable cable means whereby movement of the cable means in one direction draws the lead bow, intermediate bows and tarpaulin longitudinally across the truck body or trailer to its back end to cover it and movement of the cable means in the other direction draws the lead bow, intermediate bows and tarpaulin in the longitudinal direction to the front end to open the truck body or trailer top, the improvement wherein connector devices are provided to mount the ends of the intermediate bows on the semi-rigid linear support means, the connector device for each of the ends of the bows comprising a plug portion to releasably snugly fit inside one end of the bow, securing means to releasably lock that plug portion in position in that end of the bow and a body portion secured to the plug portion to be seated outside the end of the bow, the body portion provided with a linear aperture for slidably receiving the semi-rigid linear support means, at least a pair of the connector devices being adapted for the ends of the lead bow and the body portion of each being further provided with another linear aperture for receiving the cable means, and securing means associated with the body portion of each to releasably secure the connector to the cable means and thereby prevent relative sliding movement of the body portion with respect to the cable means.

2. A system according to claim 1 wherein the securing means comprise nut and bolt means.

3. A system according to claim 1 wherein the plug portions and body portions are of integral construction.

4. A system according to claim 3 wherein the connector devices are made of sturdy plastic.

* * * * *